United States Patent
Miyagawa et al.

(10) Patent No.: US 8,254,006 B2
(45) Date of Patent: Aug. 28, 2012

(54) OSCILLATOR DEVICE AND OPTICAL DEFLECTOR USING THE SAME

(75) Inventors: Suguru Miyagawa, Tokyo (JP); Koichi Hara, Hadano (JP)

(73) Assignee: Canon Kabushiki Kaisha, Tokyo (JP)

( * ) Notice: Subject to any disclaimer, the term of this patent is extended or adjusted under 35 U.S.C. 154(b) by 294 days.

(21) Appl. No.: 12/601,892

(22) PCT Filed: Jul. 7, 2008

(86) PCT No.: PCT/JP2008/062962
§ 371 (c)(1),
(2), (4) Date: Nov. 25, 2009

(87) PCT Pub. No.: WO2009/011405
PCT Pub. Date: Jan. 22, 2009

(65) Prior Publication Data
US 2010/0172006 A1      Jul. 8, 2010

(30) Foreign Application Priority Data

Jul. 13, 2007   (JP) ................................ 2007-183852

(51) Int. Cl.
G02B 26/08       (2006.01)
(52) U.S. Cl. .................................... 359/224.1; 359/904
(58) Field of Classification Search .... 359/196.1–226.3, 359/871, 904, 290–295, 838, 846, 872; 250/204, 250/559.06, 559.29, 230, 234; 347/255–260; 353/39, 98–99; 385/15–18, 22; 398/12, 398/19, 45
See application file for complete search history.

(56) References Cited

U.S. PATENT DOCUMENTS

| | | | |
|---|---|---|---|
| 6,816,313 B2 | 11/2004 | Hara | |
| 7,239,437 B2 | 7/2007 | Turner | |
| 7,271,943 B2 | 9/2007 | Yasuda et al. | |
| 2003/0118277 A1* | 6/2003 | Yu et al. | 385/18 |
| 2005/0030606 A1 | 2/2005 | Nakajima | |
| 2005/0128552 A1 | 6/2005 | Yasuda et al. | |
| 2006/0261680 A1 | 11/2006 | Moon et al. | |
| 2007/0091429 A1 | 4/2007 | Moon et al. | |
| 2007/0139750 A1 | 6/2007 | Velger et al. | |

FOREIGN PATENT DOCUMENTS
JP       2003-057586       2/2006
* cited by examiner

*Primary Examiner* — Jennifer L. Doak
(74) *Attorney, Agent, or Firm* — Fitzpatrick, Cella, Harper & Scinto

(57) ABSTRACT

An oscillator device includes at least one movable element supported for oscillatory motion around a rotational axis, and a damper member for applying a damping function to the oscillatory motion of the movable element, the damper member being provided along at least a portion of a locus plane defined by an edge of the movable element during oscillatory motion thereof, so that, based on a viscosity of a fluid which is present between the edge of the movable element and a portion of the damper member opposed to the edge of the movable element, the damping function is applied to applied to the oscillatory motion of the movable element.

11 Claims, 9 Drawing Sheets

OSCILLATOR DEVICE AND OPTICAL DEFLECTOR USING THE SAME

TECHNICAL FIELD

This invention relates to an oscillator device having at least one movable element which is supported for oscillatory motion and an optical equipment using the same. The oscillator device can be applied as an optical deflector, an actuator or a sensor, for example. Furthermore, the optical deflector can preferably be used in a projection display unit for projecting an image by scanningly deflection of light or an image forming apparatus such as a laser beam printer or a digital copying machine having an electrophotographic process.

BACKGROUND ART

Optical scanning systems or optical scanning devices using an optical deflector including a movable element which performs sinusoidal vibration have conventionally been proposed. The optical scanning systems using an optical deflector which performs sinusoidal vibration have advantageous features, in comparison with optical scanning systems using a rotary polygonal mirror such as a polygon mirror, that: the optical deflector can be made very small in size; the power consumption is slow; and the optical deflector made of silicon monocrystal and produced by the semiconductor process has theoretically no metal fatigue and the durability is very good.

Figure 12:
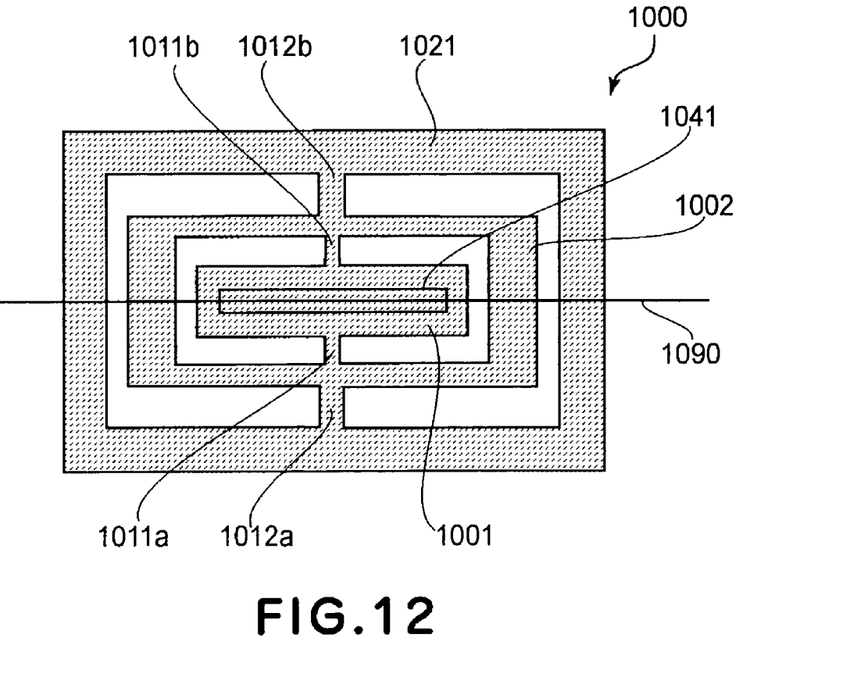
FIG. 12 is a top plan view for explaining a conventional optical deflector.

In optical deflectors using a resonance phenomenon, by exciting two or more natural oscillation modes in the torsional oscillation direction, optical scan other than the optical scanning of sinusoidal wave can be provided (see U.S. Pat. No. 7,271,943). FIG. 12 is a top plan view for explaining such optical deflector. A movable member (first movable element) 1001 of planar shape is supported by two torsion springs 1011a and 1011b at its top and bottom as viewed in the drawing, and it has a permanent magnet 1041. A movable member (second movable element) 1002 of a frame-like shape supports the torsion springs 1011a and 1011b at the inside thereof. It is supported by two torsion springs 1012a and 1012b at its top and bottom as viewed in the drawing. A supporting frame 1021 of frame-like shape supports the torsion springs 1012a and 1012b at the inside thereof. The supporting frame 1021 is bonded to a plate member 1000.

The movable members 1001 and 1002 and the torsion springs 1011 and 1012 have two natural oscillation modes, and the frequency ratio of them is in the relationship of approximately 1:2. By exciting these two modes at the same time, the optical deflector is driven by sawtooth wave oscillation, such that the optical scanning can be done with small drift of angular speed.

However, in the optical deflector of FIG. 12, no specific attention has been paid to the disturbance (which may be called "jitter") of the oscillatory motion of the movable element caused by any turbulence of a airflow around the movable member when it is oscillated at a large deflection angle or by a vibration entered from the outside.

Figure 13:
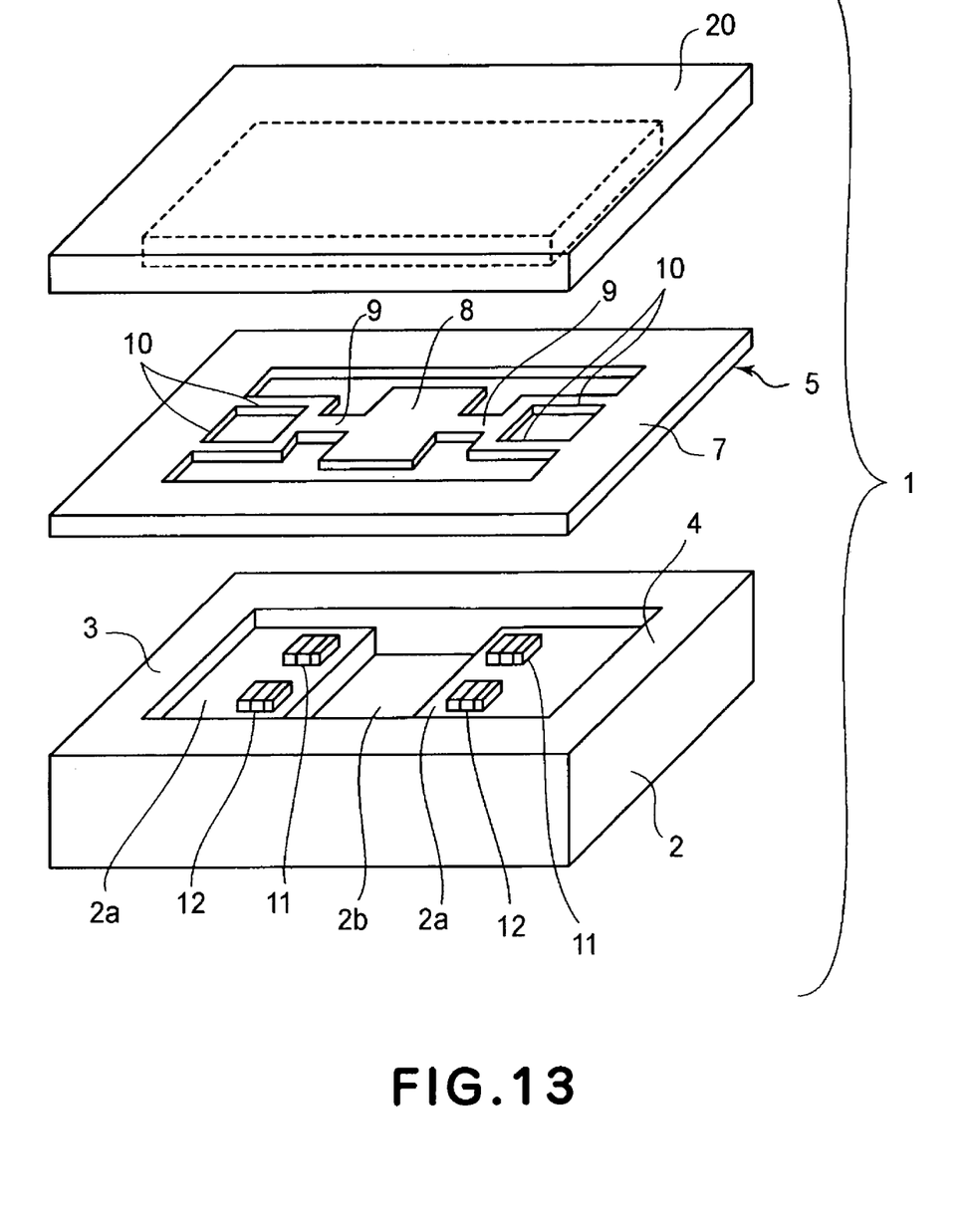
FIG. 13 is a perspective view for explaining a conventional optical deflector.

On the other hand, as an optical deflector which can stabilize the displacement angle of the movable element and the oscillatory motion thereof, there is an optical deflector such as shown in FIG. 13 which is an exploded view (see Japanese Laid-Open Patent Application No. 2003-057586). In FIG. 13, the optical deflector 1 comprises an oscillator 5, a base table 2 and a cover 20. The oscillator 5 includes a reflecting mirror (movable element) 8, torsion springs 9 and 10 coupled to the mirror, and a fixed frame member 7 to which the torsion springs 9 and 10 are coupled. The base table 2 includes supporting members 3 and 4, concaved portions 2a and 2b formed at the top surface between the supporting members 3 and 4, and electrodes 11 and 12 provided on the concaved portions 2a and 2b to oscillate the torsion spring 10. The cover 20 which covers the oscillator 5 is made of a material through which a light beam (not shown) to be deflect can be transmitted.

In such an optical deflector, when the reflecting mirror 8 oscillates and torsionally displaces, the stress produced at the connection point between the torsion springs 9 and 10 and the fixed frame member 7 can dispersed. Also, the stress can be dispersed to the torsion spring 10 as well without stress concentration only at the torsion spring 9. Thus, the torsion springs 9 and 10 need not be made too thick or too long. Thus, with a compact design, a comparatively large displacement angle (deflection angle) is provided while maintaining the resonance frequency of the reflecting mirror 8. Furthermore, by sealing the cover 20 and by thereafter filling it with a reduced pressure gas or inactive gas, any turbulence of the airflow can be reduced. In this way, the oscillatory motion of the oscillator can be stabilized.

In an electrophotographic apparatus such as a laser beam printer, an image is formed by scanning a photosensitive member surface with a laser beam. If an optical deflector such as shown in FIG. 12 is used in such apparatus and the scan is made with a large displacement angle, no particular measures have been taken to reduce the jitter of the oscillatory motion of the movable element due to a turbulence of the airflow or the like to thereby stabilize the oscillatory motion of the movable element.

On the other hand, in the case of the optical deflector shown in FIG. 13, turbulence of the airflow may be reduced by the reduced-pressure gas charging or inactive gas charging, and the displacement angle and the oscillatory motion may be stabilized thereby. However, the packaging for the reduced-pressure gas charging or inactive gas charging will lead to an increased manufacturing cost. Furthermore, since the cover is made of a material through which the light beam to be scanningly deflected by the reflection mirror surface can be transmitted, the quantity of the light beam inevitably drops to some extent.

DISCLOSURE OF THE INVENTION

In accordance with an aspect of the present invention, there is provided an oscillator device, comprising: at least one movable element supported for oscillatory motion around a rotational axis; and a damper member configured to apply a damping function to the oscillatory motion of said movable element; wherein said damper member is provided along at least a portion of a locus plane defined by an edge of said movable element during oscillatory motion thereof, so that, based on a viscosity of a fluid which is present between the edge of said movable element and a portion of said damper member opposed to the edge of said movable element, the damping function is applied to applied to the oscillatory motion of said movable element.

One movable element may be provided with a reflection surface, and said oscillator device may further comprise a driving device configured to apply a torque to at least one movable element to oscillate the same.

The oscillator device may comprise a supporting member, a first movable element having a reflection surface and at least one second movable element, wherein said first movable element and said second movable element may be supported by said supporting member through a torsion spring, for oscillatory motion around a torsion axis corresponding to the rotational axis.

At least one movable element may be supported by one torsion spring for oscillatory motion around the rotational axis, and said damper member may be provided along at least a portion of the locus plane, at a side remote from a connection between said movable element and said torsion spring.

The rotational axis and said opposed portion of said damper member may be perpendicular to each other.

The rotational axis and said opposed portion of said damper member may be parallel to each other.

The damper member may be provided along a region which includes the whole of the locus plane defined by the edge of said movable element.

The shortest distance between said opposed portion of said damper member and the edge of said movable element may be not greater than 0.5 mm.

In accordance with another aspect of the present invention, there is provided an optical instrument, comprising: a light source; an optical deflector having an oscillator device as recited above; and a target object on which a light beam should be incident; wherein said optical deflector is configured to deflect light from said light source and direct at least a portion of the light onto the target object.

In accordance with the present invention, with the provision of a damper member such as mentioned above, the jitter is reduced and, even if the displacement angle of the movable element is comparatively large, the oscillatory motion of the movable element can be stabilized. Thus, when the oscillator device of the present invention is used as an optical deflector, for example, stable optical scanning can be performed without decreasing the light quantity of scanning light beam.

These and other objects, features and advantages of the present invention will become more apparent upon a consideration of the following description of the preferred embodiments of the present invention taken in conjunction with the accompanying drawings.

BEST MODE FOR PRACTICING THE INVENTION

Preferred embodiments of the present invention will now be described with reference to the attached drawings.

First Embodiment

Referring to FIG. 1 to FIG. 5, an optical deflector according to a first embodiment of the oscillator device of the present invention will be explained. FIG. 1A is a front elevation of the optical deflector of the present embodiment. FIG. 1B is a plane view showing a region 113 in FIG. 1A. As shown in FIGS. 1A and 1B, the optical deflector of the present embodiment comprises a first movable element 101, a second movable element 102, and two types of torsion springs 103 and 104 disposed along a straight line (torsional axis 114) connecting the two movable elements 101 and 102 in series. The first movable element 101 is supported by the first torsion spring 103. The second movable element 102 supports the first torsion spring 103, and it is supported by the second torsion spring 104. A supporting member 105 supports the second torsion spring 104. In this way, the tabular first movable element and second movable element are supported by the torsion springs for torsional oscillation around the same torsional axis which is the rotational axis, relative to the supporting member 105. Here, θmax in FIG. 1B denotes the maximum deflection angle of the oscillation of the movable element (this is also the case with FIG. 7B, FIG. 7C and FIG. 10 to be described later). Furthermore, a supporting base plate 116 supports the supporting member 105 and a damper member 107 to be described below. The damper member is provided along at least a portion of the locus plane, at a side remote from the connection between the movable element and the torsion spring. Since there is no necessity of forming a throughbore in the damper member through which the torsion spring or the like should extend, if the damper member is disposed at such position, the manufacture thereof is easier.

Figure 1A:
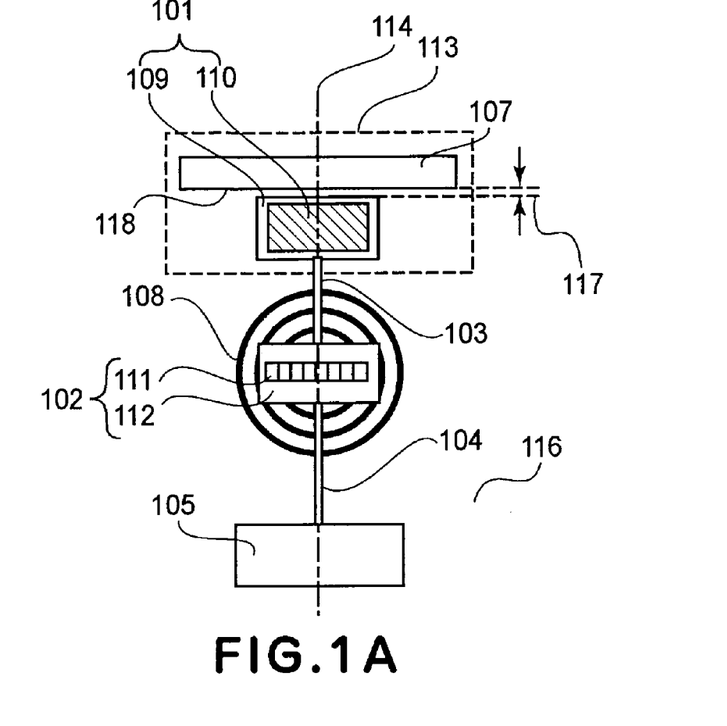
FIG. 1A is a front elevation for explaining an optical deflector according to a first embodiment of the present invention.
Figure 1B:
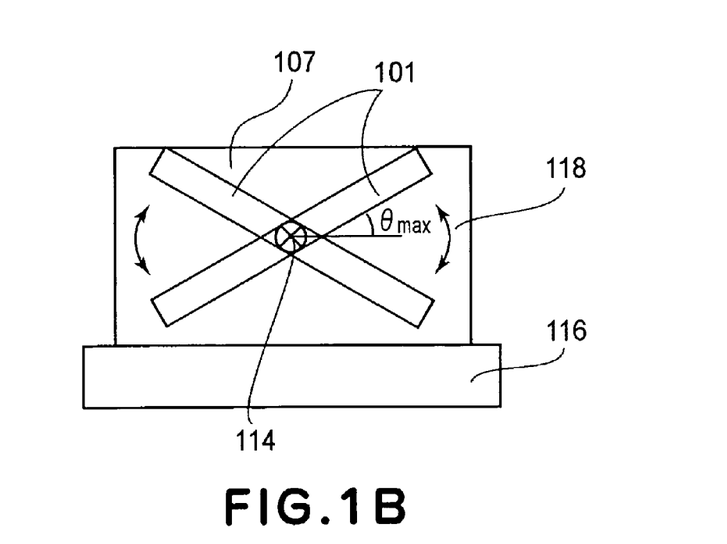
FIG. 1B is a plane view for explaining the optical deflector of the first embodiment of the present invention.

The first movable element 101 is comprised of a reflection surface 110 and a silicon member 109. The material of the reflection surface 110 is aluminum, for example. It can be formed by vacuum deposition. A protection film may be formed at the topmost surface of the reflection surface 110. The second movable element 102 is comprised of a silicon member 112 and two hard magnetic materials 111. The top and bottom surfaces of the silicon member 112 and the two hard magnetic materials 111 are bonded to each other by an adhesive. The hard magnetic materials 111 are a permanent magnet, for example.

The damper member 107 is bonded by an adhesive to the supporting base plate 116. In this embodiment, as shown in FIG. 1B, the region of the continuous damper surface 118 of the damper member 107 is made larger than the oscillation region of the first movable element 101 during the torsional oscillation thereof, as seen from the direction of the torsional axis 114. Namely, at a side remote from the connection between the movable element 101 and the torsion spring 103, the damper member 107 is provided along the region larger than region which includes the whole locus plane defined by the edge of the movable element 101 when it oscillates. However, although the damping effect may be a little different, the damper member may well be provided along at least a portion of the locus plane defined by the edge of the movable element. Alternatively, the damper member may be provided along the locus plane defined by other edges of the first movable element 101, or it may be provided along the locus plane defined by an edge of the second movable element 102.

A gap 117 illustrates the shortest distance of spacing as the damper surface 118 of the damper member 107 is directly opposed to the edge of the first movable element 101 during the oscillation of the first movable element 101. In this example, the gap 117 is 0.1 mm. Due to the damping effect (oscillation suppressing effect) which appears during the oscillation of the first movable element 101, unnecessary oscillation is relatively largely suppressed, and the oscillation of the first movable element 101 is stabilized. More specifically, due to the viscosity of the fluid which is present during the oscillation between the edge of the first movable element 101 and the damper surface 118 which is a portion of the damper member 107 opposed to the edge portion, the damping function acts on the oscillatory motion of the first movable element 101. Here, although the oscillatory motion of the first movable element 101 is comprised of various kinetic components, approximately even suppressing force (damping function) acts on the whole of these components. Thus, unnecessary components such as relatively small jitter are suppressed relatively largely, relative to major components, such that substantially only desired and necessary oscillatory motion is left and the oscillatory motion is stabilized. Thus, it can be said that, in the present invention, the oscillatory motion is stabilized by intentionally applying, to the movable element, a resistance which disturbs the oscillation thereof.

The material of the damper member 107 is resin, for example. Although in this example the damper member 107 is formed with a continuous damper surface 108, the portion of the damper member to be directly opposed to the edge of the movable element during the oscillation may have a mesh surface or a drainboard-shaped surface which is a discontinuous surface when viewed microscopically.

The silicon member 110 of the first movable element 101 has a length of 3 mm, for example, in the direction perpendicular to the torsion axis 114, and a length of 1 mm, for example, in the direction parallel to the torsion axis 114. The silicon member 112 of the second movable element 102 has a length of 3.0 mm, for example, in the direction perpendicular to the torsion axis 114, and a length of 1.5 mm, for example, in the direction parallel to the torsion axis. The supporting member 105, second torsion spring 104, silicon member 112 of the second movable element 102, first torsion spring 103, and silicon member 109 of the first movable element 101 can be formed integrally. For example, they can be formed integrally from a monocrystal silicon substrate based on photolithography and dry etching of the semiconductor production method. With such procedure, an optical deflector having high finishing precision and being small in size can be accomplished.

The permanent magnets which are hard magnetic materials 111 are adhesively bonded to both sides of the second movable element 102, respectively. Disposed blow this permanent magnet is an electric coil 108 which is provided on the supporting base plate 116 for supporting the supporting member 105 through a spacer (not shown). Here, a core (not shown) made of a high permeability material may be disposed in the clearance at the center of the electric coil 108. The base plate 116 and the electric coil 108 are adhesively bonded to each other. The permanent magnet which is a hard magnetic material 111 and the electric coil 108 constitute driving means. In response to an electric current applied to the electric coil 108, a torque acts on the hard magnetic material 111 on the second movable element 102 so that the whole oscillation system including a plurality of movable elements is driven.

The driving principle of the present embodiment will be explained. The optical deflector of the present embodiment can be treated as a two-degree-of-freedom oscillation system with respect to the torsional oscillation around the torsion axis 114, having a primary natural oscillation mode of a frequency $f_0$ which is the reference frequency and a secondary natural oscillation mode of a frequency twofold the reference frequency. The electric coil 108 of the driving means drives the optical deflector of the present embodiment, at two frequencies, that is, the frequency of the primary natural oscillation mode and the frequency two fold the reference frequency and having the same phase as the reference frequency.

Figure 2A:
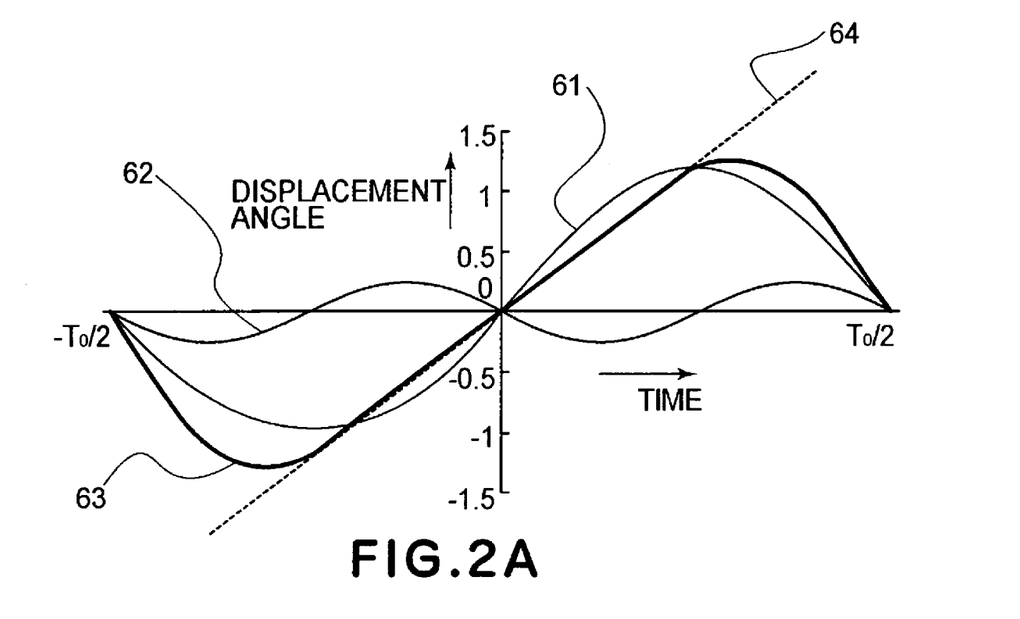
FIG. 2A is a graph illustrating the displacement angle of a movable element of an optical deflector in an embodiment of the present invention.

FIG. 2A is a graph for explaining the displacement angle of the torsional oscillation of the frequency $f_0$ of first movable element 101, while time t is taken on the axis of abscissas. Particularly, FIG. 2A illustrates the portion corresponding to a single period $T_0$ of the torsional oscillation of the first movable element 101 ($-T_0/2 \leq t \leq T_0/2$).

A curve 61 illustrates the component of the reference frequency $f_0$ among the oscillation based on the driving signal applied to the electric coil 108. It oscillates reciprocally within the range of the maximum amplitude$\pm\theta_1$. If time is t and the angular frequency is $w_0=2\pi f_0$, it is sinusoidal vibration that can be expressed by an equation below.

$$\theta_1 = \theta_1 \sin[w_0 t] \quad (1)$$

On the other hand, a curve 62 illustrates the frequency component which is twofold the reference frequency $f_0$. It oscillates within the range of the maximum amplitude$\pm\theta_2$ and it is sinusoidal vibration that can be presented by an equation (2) below.

$$\theta_2 = \theta_2 \sin[2w_0 t] \quad (2)$$

A curve 63 illustrates the displacement angle of the torsional oscillation of the first movable element 101 caused as a result of such driving. As mentioned above, the oscillation system including the movable element can be treated as a two-degree-of-freedom oscillation system with respect to the torsional oscillation, and it has a natural oscillation mode of a reference frequency $f_0$ and a secondary natural oscillation mode of a frequency $2f_0$ with respect to the torsional oscillation around the torsion axis 114. Thus, in the optical deflector of the present embodiment, there occur resonances $\theta_1$ and $\theta_2$ excited by the driving signal as aforementioned. Namely, the displacement angle of the first movable element 101 in the curve 63 corresponds to the oscillation based on superposing two sinusoidal vibrations, that is, a sawtooth-wave vibration which can be presented by equation (3) below.

$$\theta = \theta_1 \theta_2 = \theta_1 \sin[w_0 t] + \theta_2 \sin[2w_0 t] \quad (3)$$

Figure 2B:
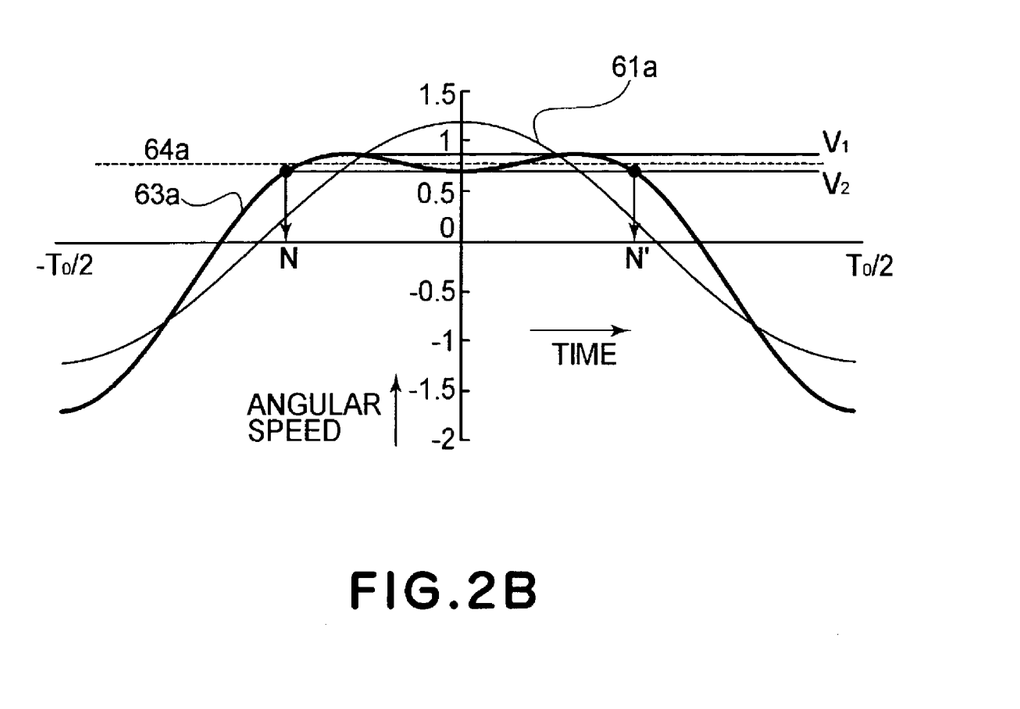
FIG. 2B is a graph illustrating the angular speed of a movable element of an optical deflector in an embodiment of the present invention.

FIG. 2B illustrates curves 61a and 63a and a straight line 64a which are obtained by differentiating the curves 61 and 63 and the straight line 64 of FIG. 2A, and it explains the angular speed of these curves. As compared with the curve 61a which is the angular speed of the sinusoidal vibration of the reference frequency $f_0$, the curve 63a illustrating the angular speed of the sawtooth-wave reciprocal oscillation of the movable element is as follows. Namely, in the section N-N', the angular speed fits in the range having a maximum and a minimum corresponding to the angular speed $V_1$ at the local maximum point and the angular speed $V_2$ at the local minimum point. Thus, in the application using the scanning deflection of the light by the optical deflector of the present embodiment, if $V_1$ and $V_2$ are present within the allowable error range of the angular speed from the straight line 64a which means the constant angular-speed scan, the section N-N' can be regarded as being substantially constant angular scan. In regard to the angular speed of scanning deflection, as described above, the substantially constant angular-speed region can be widened by the sawtooth-wave reciprocal oscillation, as compared with a case where the displacement angle is a sinusoidal wave. Thus, the available region relative the whole region of scanning deflection can be enlarged.

In the foregoing description, a case where two natural oscillation modes have frequencies of approximately twofold relationship has been explained. If the relationship is approximately threefold, the shape of superposed oscillation will be approximately chopping wave. In that occasion, since the approximately constant angular-speed region appears in the reciprocation of the scanning deflection, it is particularly suitable for those applications in which the constant angular speed is used in the reciprocation.

Where the driving such as mentioned above is to be carried out, the plurality of natural oscillation modes should be adjusted in a desired relationship and the displacement angle as well as the oscillatory motion should be stabilized. In the optical deflector of this embodiment, the inertia moment $I_2$ of the second movable element 102 is made larger than the inertia moment $I_1$ of the first movable element 101, with regard to the torsion axis 114, by which the two natural oscillation frequencies can be adjusted in a desired relationship quite easily.

For example, where the inertia moments of the first and second movable elements are in the relationship of $I_1 > I_2$, if the inertia moment is changed, then both of the two natural oscillation frequencies change greatly. Furthermore, even if the inertia moment $I_2$ is changed, both of the two natural oscillation frequencies change greatly. Therefore, the two natural oscillation frequencies of torsional oscillation cannot be adjusted individually. On the other hand, where the inertia moments of the first and second movable elements are in the relationship of $I_1 < I_2$, if the inertia moment $I_1$ or $I_2$ is changed, either the primary natural oscillation mode or the secondary natural oscillation mode can be mainly changed. Preferably, $I_2$ had better be quadruple or more of $I_1$.

Hence, if the two natural oscillation modes are not in a desired relationship with each other due to the dispersion in shape during the manufacture of the optical deflector, for example, the two natural oscillation modes of torsion can be adjusted in a desired frequency relationship by adjusting the inertia moment $I_1$ or $I_2$.

Furthermore, the amplitude amplification factor (resonance sharpness Q-value) of the natural oscillation mode can be improved by enlarging the inertia moment $I_2$. By enlarging the inertia moment to make the amplitude amplification factor larger and by controlling dispersion of the vibrational energy, the stability of the displacement angle and oscillatory motion can be improved.

Figure 3:
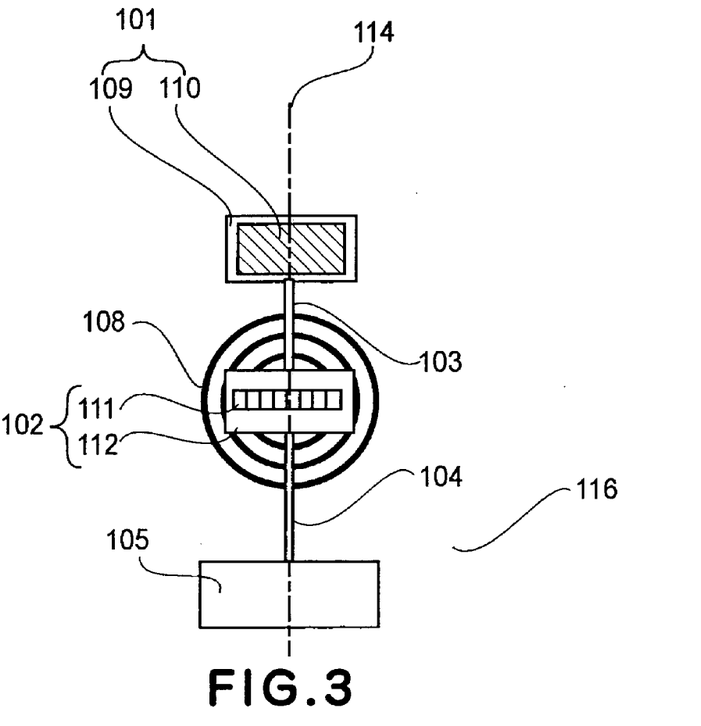
FIG. 3 is a front elevation for explaining an optical deflector of a comparative example.

The damping effect of the damper member 107 will be explained furthermore. FIG. 3 shows the optical deflector when the damper member 107 is not provided in the optical deflector of FIG. 1. The stability of the displacement angle of the first movable element 101 in the optical deflector of FIG. 1 and FIG. 3 was actually measured. The results are as follows.

Figure 5:
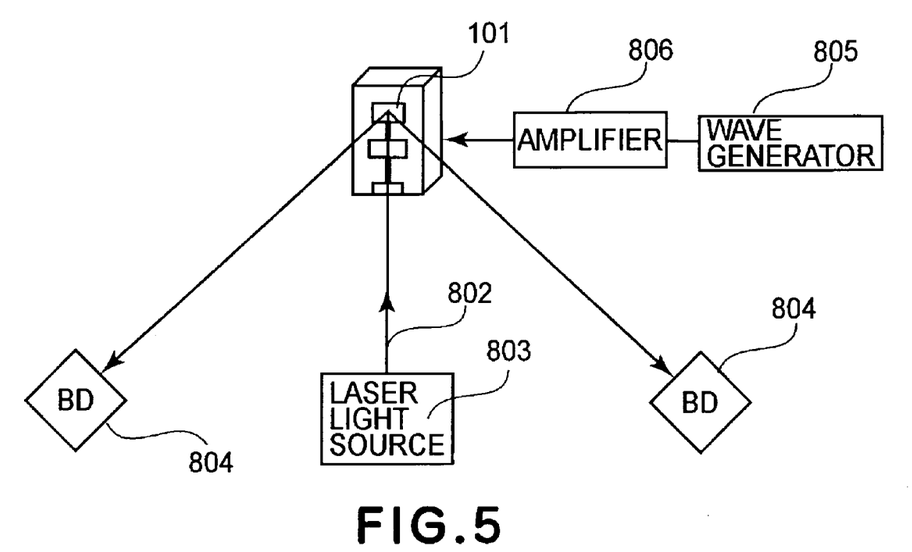
FIG. 5 is a diagram illustrating an experimental system used to clarify the effect of the optical deflector of an embodiment of the present invention.

FIG. 5 shows an experiment system for measuring the stability of the displacement angle of the movable element 101. A sinusoidal wave generated by a wave generator 805 is amplified by an amplifier 806 and, by applying an alternating current to the coil (not shown), the first movable element 101 is oscillated (maximum displacement angle 38 deg.). A light ray 802 emitted from a light source 803 is reflected by the first movable element 101 which is being oscillated, and the reflected light ray is received by two beam detectors (BD) 804. The two beam detectors 804 are disposed at position corresponding to the displacement angles±30 deg., respectively, and for every scan, the light receiving time interval between these beam detectors 804 is measured by means of a time interval analyzer (not shown). From the scan unevenness as determined by the light receiving time interval between the beam detectors BD for every scan as measured as described above, the stability of the displacement angle of the first movable element 101 is evaluated. The scan unevenness can be represented by the mean of peak-to-peak values of the light receiving time interval.

Figure 4:
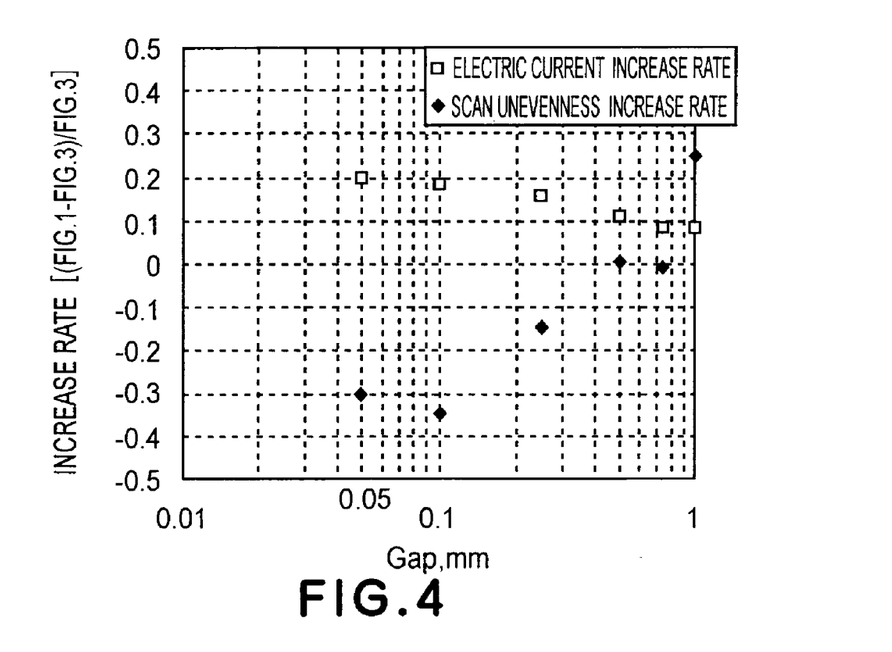
FIG. 4 is a graph which shows experimental results to explain the damping effect of an optical deflector in an embodiment of the present invention.

FIG. 4 is a graph illustrating the results of the increasing rate obtained by measuring the scan unevenness while changing the gap 117 in FIG. 1 in the experiment system of FIG. 5, as well as the driving current values at that time. In FIG. 4, as the gap 117 of the optical deflector of FIG. 1 reaches 0.1 mm, the scan unevenness is reduced by about 35% as compared with the optical deflector of FIG. 3. Furthermore, the driving current value of the optical deflector of FIG. 1 at that time increases by about 18% as compared with the optical deflector of FIG. 3. Namely, if the damper surface of the damper member 107 closely approaches the oscillation locus plane of the first movable element 101 such as above, the damping effect is increased thereby. Also, a repressing force is applied to the overall oscillatory motion of the first movable element 101, and it can be said that unnecessary oscillation of the first movable element 101 is reduced by that. It is seen from FIG. 4 that, in order to obtain a preferable damping effect for reducing unnecessary oscillation of the first movable element 101, the gap 117 had better be set to about 0.5 mm or less. If the gap 117 is around 1 mm or more, the scan unevenness rather grows large. This seems to be for the reason that a turbulent flow is produced between the edge of the movable element and the damper member, causing the jitter worse. However, these values are determined in dependence upon the surface state of the damper member, setting point, number, area, and so on. Anyway, as described above, reduction of the scan unevenness by the damping effect was confirmed through the experiment.

Here, the stability of the displacement angle can be improved even by making the length of the second movable element 102 in a direction perpendicular to the torsion axis 114 longer than the length of the first movable element 101 in a direction perpendicular to the torsion axis 114. Furthermore, the stability of the displacement angle can be improved even by making the length of the second movable element 102 in a direction parallel to the torsion axis 114 longer than the length of the first movable element 101 in a direction parallel to the torsion axis 114. Therefore, regardless of the direction in which the second movable element 102 is elongated, the stability of the displacement angle can be improved. Also, here, it is easy to make the inertia moment $I_2$ larger than the inertia moment $I_1$.

Furthermore, in the optical deflector of the present embodiment, the first movable element 101 is supported in a cantilever fashion, and the supporting member 105, one first torsion spring 103 and one second torsion spring 104 are coupled with each other. Thus, even if an unnecessary force is applied to the supporting member 105 due to a stress as the same is fixed or a thermal stress and deformation occurs at the fixing position with the supporting member 105, substantially no stress will be applied to the first movable element 101 and the second movable element 102. Thus, degradation of the flatness (profile irregularity) of the reflection surface of the first movable element 101 can be prevented.

In the optical deflector of the present embodiment, the second movable element 102 is comprised of a plurality of members (silicon member 112 and hard magnetic material 111). On the other hand, the first movable element 101 having a reflection surface 110 is formed from a single member. Thus, even if the second movable element 102 is deformed as the hard magnetic material 111 is adhered to and fixed to the silicon member 112, the reflection surface 110 on the first movable element 101 is not deformed. Therefore, deterioration of the scanning spot can be avoided assuredly.

The structure described above can be modified in the manner shown in FIG. 6. In the optical deflector of the modified example of FIG. 6, the first movable element 201 is surrounded by the second movable element 202 having a frame-like shape, and the second movable element 202 is supported by a supporting member 205 through two second torsion springs 204. In this case, the second movable element 202 is supported at its opposite ends. Thus, the tilt quantity (axis tilt quantity) in the direction of a normal to the first movable element 201 at its stationary position, caused during the oscillation, can be reduced. Furthermore, even if the volume of the hard magnetic material 211 is increased, the quantity of axis tilt due to the gravity does not increase. Furthermore, since the second movable element 202 surrounds the first movable element 201, it is easy to make the inertia moment $I_2$ larger than the inertia moment $I_1$. The remaining points are similar to the preceding embodiment.

Figure 6:
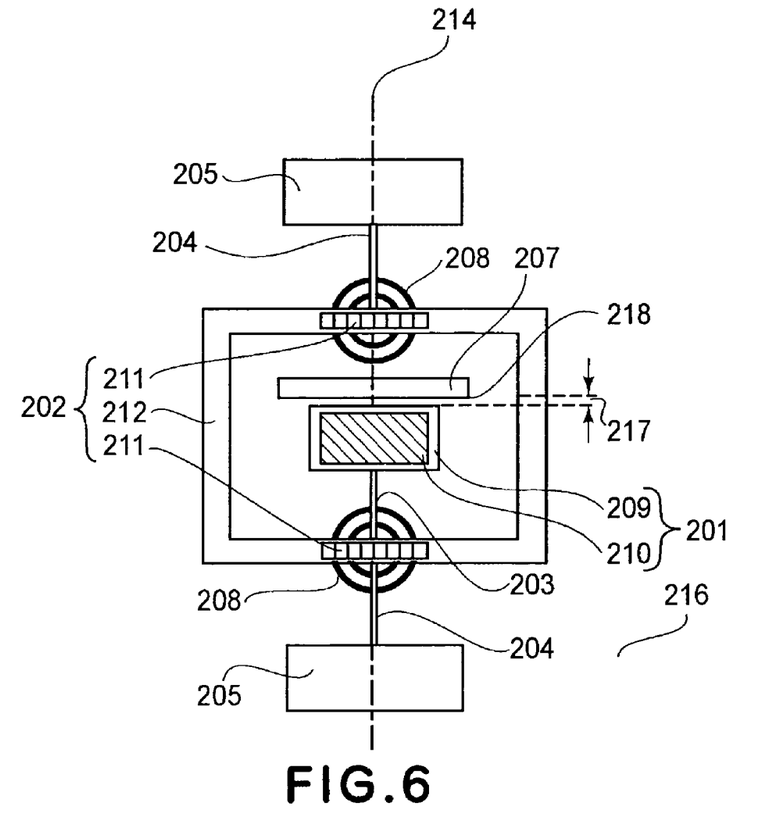
FIG. 6 is a front elevation for explaining a modified example of the optical deflector of the first embodiment of the present invention.

In FIG. 6, denoted at 203 is a first torsion spring, and denoted at 207 is a damper member. Denoted at 208 is an electric coil, and denoted 209 is a silicon member of the first movable element 201. Denoted at 210 is a reflection surface of the first movable element 201. Also, denoted at 212 is a silicon member of the second movable element 202, and denoted at 216 is a supporting base plate. Denoted at 217 is a gap, and denoted at 218 is a damper surface of the damper member 207. It is a possible alternative structure in the modified example of FIG. 6 that the disposition of the first torsion spring 203 and the first movable element 201 is rotated by about 90 degrees. More specifically, the first torsion spring 203 may be extended laterally from the vertically extending portion of the second movable element 202, as viewed in FIG. 6, and the first movable element 201 may be connected to the extended portion of the torsion spring, such that the rotational axis direction of the first movable element 201 intersects with the rotational axis direction of the second movable element 202. Even in such structure, a damper member can be added to provide the damping effect mentioned hereinbefore.

In accordance with to the present embodiment, since a tabular damper member is provided while an appropriate gap is kept to separate the same from the oscillation locus plane of the edge of the movable element, unnecessary vibrational components such as jitter are reduced considerably. Therefore, even if the displacement angle of the movable element is comparatively large, the oscillatory motion of the movable element is stabilized. Thus, when an optical deflector of the present embodiment is used, stable optical scanning can be performed without decreasing the light quantity of scanning light beam.

Second Embodiment

Figure 7A:
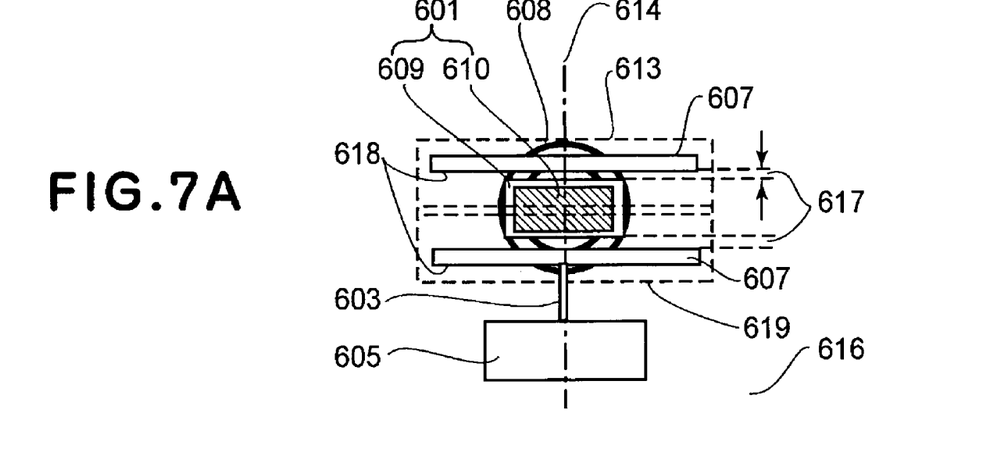
FIG. 7A is a front elevation for explaining an optical deflector according to a second embodiment of the present invention.
Figure 7B:
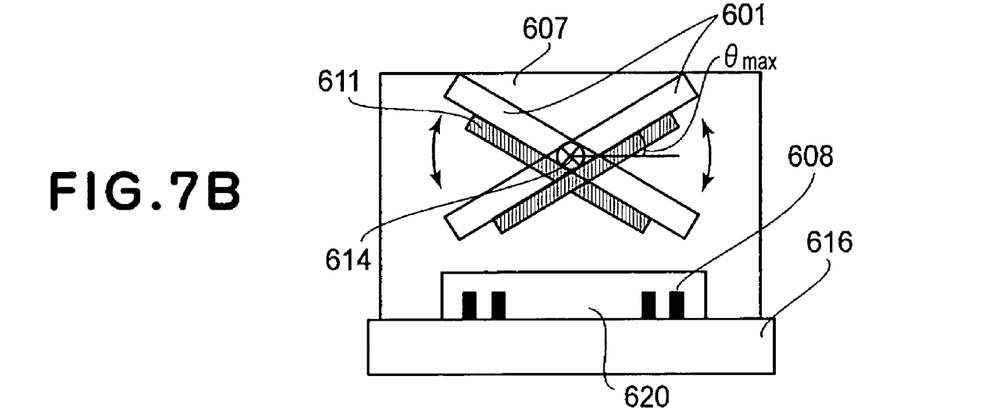
FIG. 7B is a plan view for explaining the optical deflector of the second embodiment of the present invention.
Figure 7C:
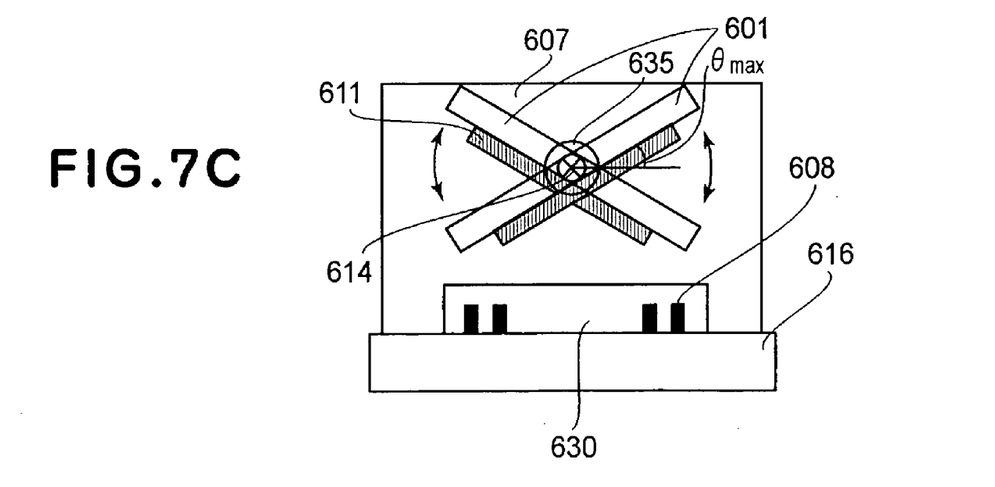
FIG. 7C is another plan view for explaining the optical deflector of the second embodiment of the present invention.

An optical deflector according to a second embodiment of the oscillator device of the present invention will be explained. FIG. 7A is a front elevation of the optical deflector of the present embodiment. FIG. 7B is a plane view of a region 613 of FIG. 7A. FIG. 7C is a plane view of a region 619 of FIG. 7A. In this embodiment, as shown in FIG. 7A, one movable element 601 is supported by one torsion spring 603, and a supporting member 605 supports the torsion spring 603. A supporting base plate 616 supports the supporting member 605 and two damper members 607.

The movable element 601 is comprised of a reflection surface 610, a silicon member 609 and a hard magnetic material 611. The material of the reflection surface 610 provided on the top surface of the silicon member 609 is aluminum, for example. It is formed there by vacuum deposition. A protection film may be formed on the topmost surface of the reflection surface 610. The hard magnetic material 611 is a permanent magnet, for example. It is bonded by an adhesive to the bottom surface of the silicon member 609. The two damper members 607 are bonded by an adhesive to the supporting base plate 616. The material of the damper members 607 is a resin, for example.

In the present embodiment, the damper members 607 are provided at two locations relative to the movable element 601, perpendicularly to the torsion axis 614. The damper surfaces 618 of the two damper members 607 are opposed respectively to the locus planes defined by two edges of the movable element 601 which extends in a direction perpendicular to the torsion axis 614, while a gap 617 is interposed therebetween. With this arrangement, the damping effects can be enhanced and the oscillation of movable element 601 can be stabilized furthermore.

Here, in the optical deflector of the present embodiment, only the movable element 601 having a reflection surface 610 oscillates. Thus, turbulence of the airflow due to the oscillation of the movable element is minimized and the oscillatory motion of the movable element 601 can be stabilized. The driving means comprising an electric coil 608 and a hard magnetic material 611 as well as the remaining points are similar to those of the first embodiment. In FIG. 7B and FIG. 7C, denoted at 620 and 630 are apertures formed in the damper member 607 through which the electric coil extends. Denoted at 635 is a circular throughbore formed in the damper member 607 through which the torsion spring 603 extends.

Figure 8:
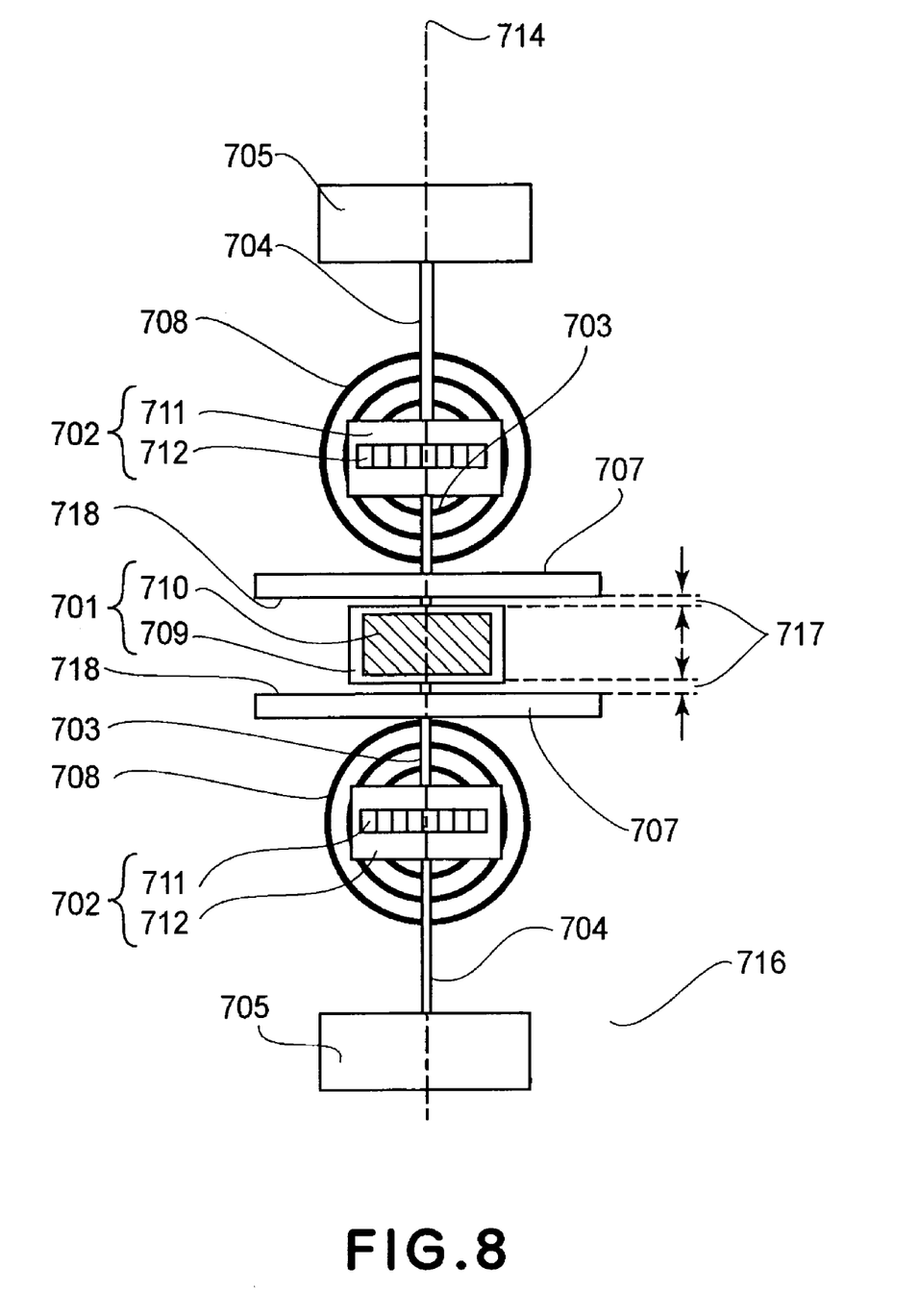
FIG. 8 is a front elevation for explaining a modified example of the optical deflector according to the second embodiment of the present invention.

A modified example of the present embodiment will be explained. FIG. 8 is a front elevation of the optical deflector of this modified example. In this example, the first movable element 701 is sandwiched by two second movable elements 702. In FIG. 8, the first movable element 701 is supported by the two second movable elements 702 through two first torsion springs 703. Furthermore, the two second movable elements 702 are supported by a supporting member 705 through two second torsion springs 704. Since the first movable element 701 is sandwiched and supported by the two second movable elements 702, the area of the second movable element 702 can be narrowed. As a result of this, turbulence of the airflow due to the oscillation of the optical deflector in FIG. 8 is reduced, and the oscillation of the optical deflector can be stabilized. Furthermore, since the first movable element 701 is supported at its opposite ends, the axis tilt quantity described hereinbefore is reduced. The driving principle of the optical deflector and the damping effect thereof are the same as the first embodiment.

In FIG. 8, denoted at 707 is a damper member, and denoted at 708 is an electric coil. Denoted at 709 is a silicon member of the first movable element 701, and denoted at 710 is a reflection surface of the first movable element 701. Denoted at 711 is a hard magnetic material of the second movable element 702, and denoted at 712 is a silicon member of the second movable element 702. Denoted at 714 is a common torsion axis, and denoted at 716 is a supporting base plate. Denoted at 717 is a gap, and denoted at 718 is a damper surface of the damper member 707.

Third Embodiment

Figure 9:
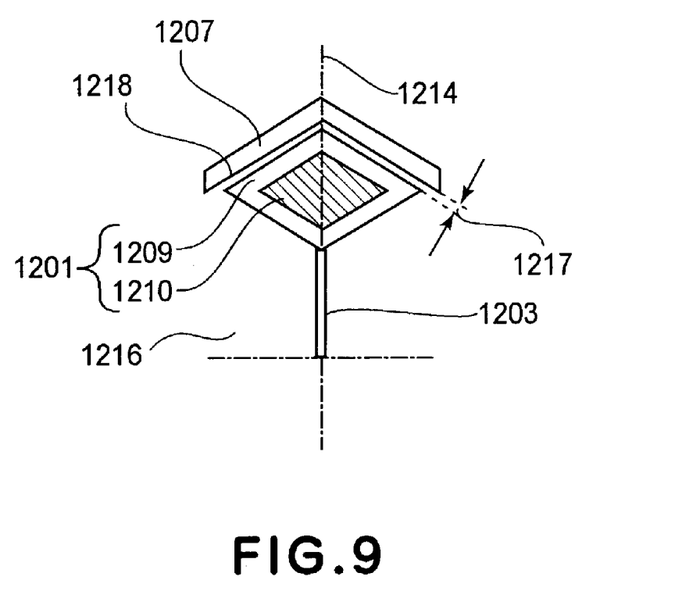
FIG. 9 is a front elevation for explaining an optical deflector according to a third embodiment of the present invention.

An optical deflector according to a third embodiment of the oscillator device of the present invention will be explained. As shown in FIG. 9 which is a front elevation, in the optical deflector of the present embodiment, the shape of the first movable element 1201 is a diamond shape. A damper member 1207 having a damper surface 1218 is provided along a locus plane of conical shape defined by two sides of the rhombus. The damper member 1207 is formed symmetrically about the torsion axis 1214. FIG. 9 is a front elevation for explaining the portion around the first movable element 1201. The remaining points are similar to the optical deflector of FIG. 1. In accordance with the present embodiment, the portion of the reflection surface 1210 which is spaced apart from the torsion axis 1214 reduces, such that the air resistance which the first movable element 1201 receives during the torsional oscillation is reduced. Thus, the oscillation of first movable element 1201 is stabilized furthermore.

In FIG. 9, denoted at 1203 is a first torsion spring, and denoted at 1209 is a silicon member of the first movable element 1201. Denoted at 1216 is a supporting base plate, and denoted at 1217 is a gasp. Although a rhomboid movable element is used in the present embodiment, depending on the situation the shape may be a triangle or circle, and the damper member may be provided along a locus plane of conical shape or spherical shape.

Fourth Embodiment

Figure 10:
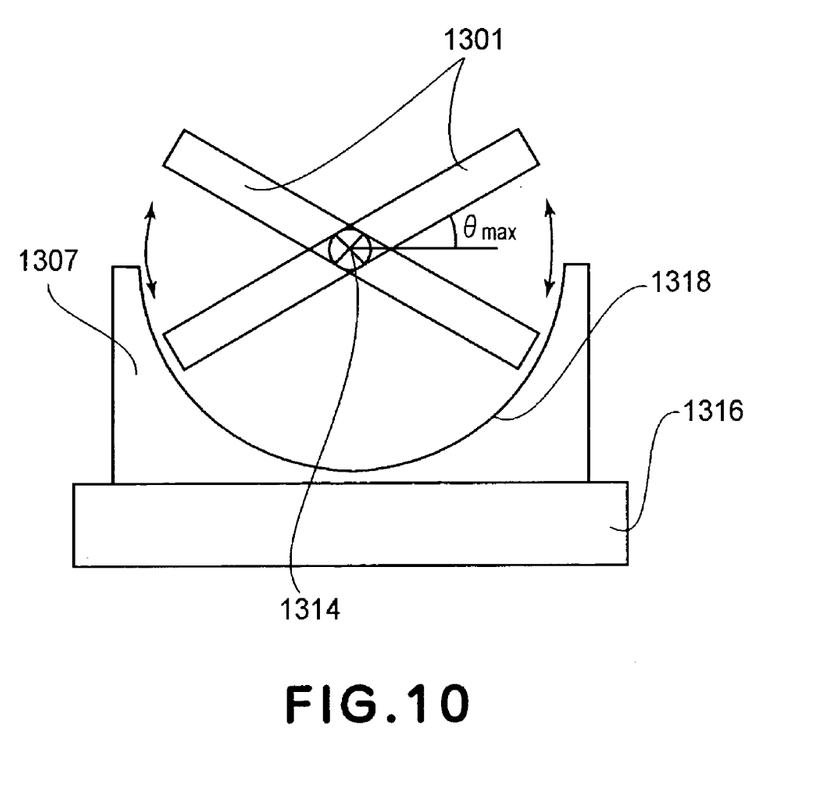
FIG. 10 is a plane view for explaining an optical deflector according to a fourth embodiment of the present invention.

An optical deflector according to a fourth embodiment of the oscillator device of the present invention will be explained. As shown in FIG. 10 which is a view as seen from the direction of the torsion axis 1314, in the optical deflector of the present embodiment, a damper member 1307 having a damper surface 1318 is provided along a curved locus plane defined by an edge of the first movable element 1301 being oscillated, which edge is parallel to the torsion axis 1314 which is the rotational axis of the first movable element 1301. With regard to this point, in the aforementioned example, the rotational axis of the movable element and the portion of the damper member opposed to the edge of the movable element are perpendicular to each other.

The damper member 1307 is fixed to a supporting base plate 1316. FIG. 10 is a sectional view along a plane perpendicular to the torsion axis 1314 which is the rotational axis of the first movable element 1301. The other structures of the present embodiment are similar to the optical deflector of FIG. 1. In this embodiment, as described above, the damper surface 1318 is disposed opposed to the edge of the first movable element 1301 which is most spaced apart from the torsion axis 1314 and which is the fastest-speed portion of the first movable element, with a gap interposed therebetween. With this arrangement, the damping effect is enhanced furthermore. In the example of FIG. 10, although the damper surface 1318 extends only up to the middle of the curved locus plane defined by the edge of the first movable element 1301, the damper surface may be extended furthermore so as to cover the whole curved locus plane. Furthermore, the damper surface may be extended by 360 degrees around the torsion axis 1314 to have a tubular form. The damping effect can be enlarged by such arrangement. With regard to the degree extending the damping surface, it can be designed appropriately in accordance with the requirements.

Fifth Embodiment

Figure 11:
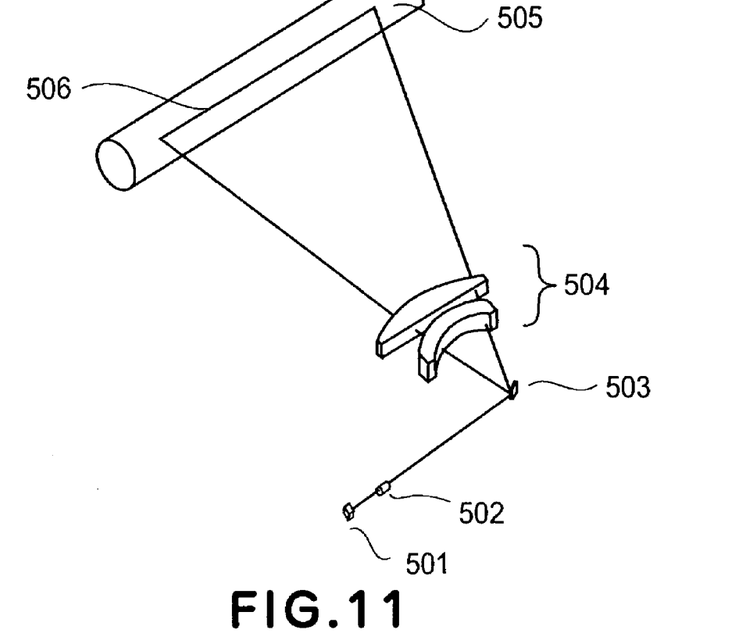
FIG. 11 is a schematic diagram for explaining an optical equipment according to a fifth embodiment of the present invention.

FIG. 11 is a diagram showing an embodiment of an optical equipment using an optical deflector based on an oscillator device of the present invention. Here, an image forming apparatus is shown as the optical equipment. In FIG. 11, denoted at 503 is the optical deflector of the present invention which is arranged, in the present embodiment, to scanningly deflect an incident light beam one-dimensionally. Denoted at 501 is a laser source. Denoted at 502 is a lens or lens group. Denoted at 504 is a writing lens or lens group. Denoted at 505 is a photosensitive member which is the target on which the light beam should be incident. Denoted at 506 is a scan locus.

The laser beam projected from the laser source 501 undergoes predetermined intensity modulation related to the timing of the scanning deflection of the light, and then it is scanningly deflected one-dimensionally by the optical deflector 503. By the function of the writing lens 504, the thus scanned laser beam forms an image on the photosensitive member 505 which is rotating at a constant speed around the rotational center. The photosensitive member 505 is uniformly electrically charged a charging device (not shown). Thus, when it is scanned with light, an electrostatic latent image is formed on the scanned portion. Subsequently, a toner image is formed on the image portion of the electrostatic latent image by means of a developing device (not shown). This toner image is transferred to a paper sheet (not shown) and fixed thereon, by which an image is produced on the paper sheet. With the optical deflector of the present invention, the angular speed of the scanning deflection of the light can be made approximately constant angular speed within a specified range. Furthermore, with the use of the optical deflector of the present invention, an image forming apparatus which is able to produce images stably can be accomplished.

An optical deflector which is comprised of an oscillator device of the present invention including a movable element with a reflection surface, driving means for applying a torque to at least one movable element to oscillate the same, and a damper member, can be incorporated into a visual display unit. In that occasion, the optical deflector deflects the light from a light source and directs at least a portion of the light onto an image display member which is the target on which the light should be incident.

While the invention has been described with reference to the structures disclosed herein, it is not confined to the details set forth and this application is intended to cover such modifications or changes as may come within the purposes of the improvements or the scope of the following claims.

The invention claimed is:

1. An oscillating device comprising:
    an oscillating member configured to oscillate about an oscillation axis and having a surface substantially perpendicular to the oscillation axis; and
    a viscous damping member disposed relative to the oscillating member such that (1) a surface of the viscous damping member has a face-to-face relationship with the surface of the oscillating member, and (2) a gap is present between the surface of the oscillating member and the surface of the viscous damping member,
    wherein the oscillating device is configured to maintain the face-to-face relationship between the surface of the viscous damping member and the surface of the oscillating member, and substantially maintain the gap therebetween, during oscillation of the oscillating member, and
    wherein a gap distance is set such that a damping effect on the oscillation of the oscillating member is provided by a viscosity of the air in the gap during a relative movement of the oscillating member and the viscous damping member.

2. An oscillating device according to claim 1, further comprising:
    a reflecting mirror disposed perpendicularly to the surface of the oscillating member.

3. An oscillating device according to claim 2, wherein the viscous damping member is disposed on a distal side of the oscillating member from the shaft.

4. An oscillating device according to claim 1, further comprising:
    a shaft disposed coaxially to the oscillation axis and connected to the oscillating member so as to oscillate the oscillating member.

5. An oscillating device according to claim 1, wherein the gap distance is not more than 0.5 mm.

6. An oscillating device comprising:
    an oscillating member, configured to oscillate about an oscillation axis, that includes an end surface distally located from the oscillation axis and parallel to the oscillation axis; and
    an viscous damping member disposed relative to the oscillating member such that (1) a surface of the viscous damping member has a face-to-face relationship with the end surface of the oscillating member, and (2) a gap is present between the end surface of the oscillating member and the surface of the viscous member,
    wherein the oscillating device is configured to maintain the face-to-face relationship between the surface of the viscous damping member and the end surface of the oscillating member, and substantially maintain the gap therebetween, during oscillation of the oscillating member, and
    wherein a gap distance is set such that a damping effect on the oscillation of the oscillating member is provided by a viscosity of the air in the gap during the relative movement of the oscillating member and the viscous damping member.

7. An oscillating device according to claim 6, further comprising:
    a reflecting mirror disposed perpendicularly to the end surface of the oscillating member.

8. An oscillating device according to claim 6, further comprising:
    a shaft disposed coaxially to the oscillation axis and connected to the oscillating member so as to oscillate the oscillating member.

9. An oscillating device according to claim 8, wherein the viscous damping member is disposed parallel to the oscillation axis.

10. An oscillating device according to claim 9, wherein the viscous damping member has a cross-sectional surface profile, in a plane perpendicular to the oscillation axis, that conforms to a locus plane defined by the end surface of the oscillating member.

11. An oscillating device according to claim 1, wherein the gap distance is not more than 0.5 mm.

* * * * *